United States Patent [19]

Irby

[11] Patent Number: 4,778,232

[45] Date of Patent: Oct. 18, 1988

[54] ROCKER ARM LOADER

[75] Inventor: John D. Irby, Plano, Tex.

[73] Assignee: Varo, Inc., Garland, Tex.

[21] Appl. No.: 18,996

[22] Filed: Feb. 26, 1987

[51] Int. Cl.$^4$ .............................................. G02B 26/08
[52] U.S. Cl. ................................................. 350/6.4
[58] Field of Search .................... 351/6.4; 74/96, 519, 74/522, 54

[56] References Cited

U.S. PATENT DOCUMENTS 4,502,751 3/1985 Fjeldsted et al. ................... 350/6.4

Primary Examiner—John K. Corbin
Assistant Examiner—Jay Ryan
Attorney, Agent, or Firm—Jerry W. Mills

[57] ABSTRACT

A device and method for preloading a force against two counter-reciprocating (116 and 118) members has a rocker arm (136) having a fulcrum (114) and a predetermined force constantly applied against said rocker arm at approximately said fulcrum (114). Said rocker arm (136) bears against a contact surface (148 and 150) on each counter-reciprocating member. The rocker arm (136) is positioned so that, as said members counter-reciprocate, said rocker arm (136) maintains its contact with each of said contact surfaces (148 and 150) and transfers at least a portion of said predetermined force to each of said contact surfaces (148 and 150) throughout said counter-reciprocation of said members.

26 Claims, 3 Drawing Sheets

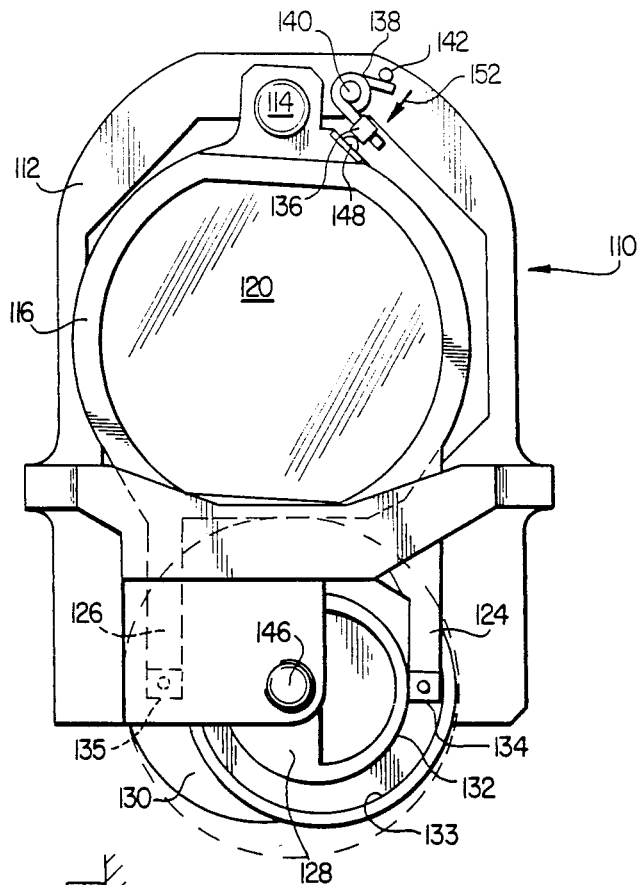
FIG. 3
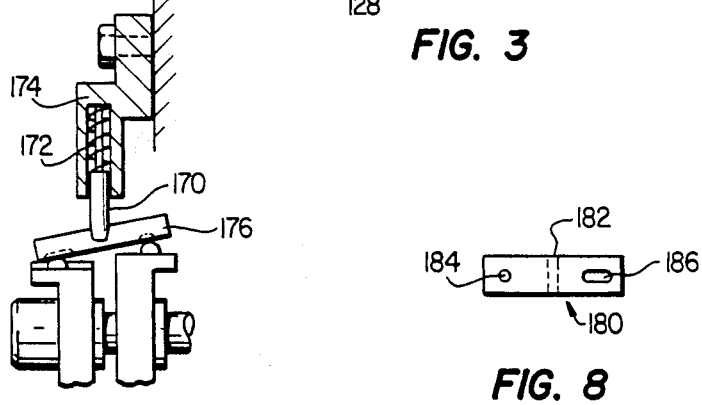
FIG. 7
FIG. 8

ROCKER ARM LOADER

TECHNICAL FIELD OF THE INVENTION

This invention relates to methods and apparatus for use with counter-reciprocating structures, and more particularly, to methods and apparatus for loading a predetermined force against two counter-reciprocating structures in a linear optical scanner.

BACKGROUND OF THE INVENTION

Linear optical scanners have application in surveillance systems. They are used in lens systems to periodically and reciprocally translate an image received by the system between a first and second limit position on a focal plane of the system. Prior linear optical scanners, as exemplified by U.S. Pat. No. 4,502,751 to Fjeldsted et al., are particularly adapted for use in light weight forward looking infrared surveillance systems.

The prior scanners have included first and second wedge prisms which are periodically and reciprocally counter-rotated through a predetermined angle about a common pivot axis. By counter-reciprocating the wedge prisms a light image passing through the prisms is translated between the first and second limit positions on a focal plane of the system.

One structure previously described for periodically and reciprocally counter-rotating each wedge prism comprises one or more cams in combination with cam followers and a return spring which holds the cam followers against the respective surfaces of the cam.

It has been found in certain applications of a linear optical scanner that it would be desirable to use a low-torque motor to drive the aforementioned cams. It is further desirable in many applications to reduce and minimize the weight and size of an optical scanner, as well as the power consumption of the drive motor. A need has also arisen for techniques to reduce the audible noise arising from the travel of the cam followers over the surfaces of cams and to reduce the radial force exerted on the cam shaft by the cam followers. It would also be highly desirable to maximize motor speed control for the drive motor of an optical scanner.

The return spring arrangement of prior devices for maintaining the cam followers against their respective cam surfaces prevents the above-noted desirable improvements from being implemented. The return spring of these prior devices is designed to provide at its point of minimum stretch, or most relaxed state, a predetermined minimum force to hold each cam follower against its respective cam surface. As the wedge-prisms are reciprocally counter-rotated, the return spring is alternately stretched and relaxed, thus producing an oscillating load on the cam followers. As the spring is increasingly stretched from its most relaxed state, a greater than the desired minimum load or force is exerted by the cam followers on the cam surface. This increased loading puts an undesirable excess radial force on the cam shaft and requires a higher power consumption by the drive motor than would be required if only the minimum desired force were exerted against the cam surfaces. This also results in increased audio noise generated at the interface between the cam followers and the cam surfaces, increased wear on the cam and cam followers, increased wear on the cam bearing and cam follower bearings, and an undesired increased radial loading on the cam drive gear head and outport bearings. Further, the oscillating load on the cams adversely affects motor speed control, particularly where a low-torque motor is used. In addition, the structure of the return spring arrangement of the prior devices requires greater weight and space than is optimum.

The Fjeldsted patent also describes another method of maintaining contact between the cam followers and the cams. In the alternately proposed method, a follower pin is inserted into a cam race or groove cut into a surface of the cam to describe the required cam travel of the follower while preventing the cam follower surfaces from leaving the cam surface. It has been found, however, that the restraints of manufacturing tolerances and the necessary allowance of sufficient clearance for the cam follower to travel smoothly in the groove result in an unacceptable lack of precision, for some applications, in the motion of the cam followers. Accordingly, it is necessary to load the cam follower with some force against one of the cam surfaces even if the cam follower travels in a groove in the cam.

SUMMARY OF THE INVENTION

The present invention comprises apparatus and methods for providing an approximately constant force, or non-oscillating load, on each of two counter-reciprocating structures. A rocker arm is provided which contacts each of the counter-reciprocating structures at a contact point on each of said structures. The rocker arm has a fulcrum and a predetermined force is applied at the fulcrum of the rocker arm. At least a portion of the predetermined force is applied through the rocker arm to each of the contact points. The rocker arm is positioned with its fulcrum parallel to some point between the contact points so that as the structures counter-reciprocate, the rocker arm tilts or rocks on its fulcrum, maintaining contact with each contact point and transmitting at least a portion of said predetermined force to each contact point throughout the reciprocation cycle of each of the structures.

The present invention has particular application in exerting an approximately constant force against a pair of cam driven counter-oscillating structures which pivot from a common pivoting point. The invention serves to provide an approximately constant preload force which maintains the cam followers of the counter-oscillating structures against the cam surfaces which drive the oscillation movements of each structure.

BRIEF DESCRIPTION OF THE DRAWINGS

For more complete understanding of the invention and the advantages thereof, reference is now made to the following description, taken in conjunction with the accompanying drawings in which:

FIG. 3 is a front elevation view of a linear optical scanner showing an embodiment of the present invention;

FIG. 7 is a sectional view of an embodiment of the present invention utilizing a compression spring;

FIG. 8 shows the surface of the rocker arm which bears against the contact points of the wedge prism frames in accordance with one embodiment of the present invention.

DETAILED DESCRIPTION OF THE INVENTION

Figure 1:
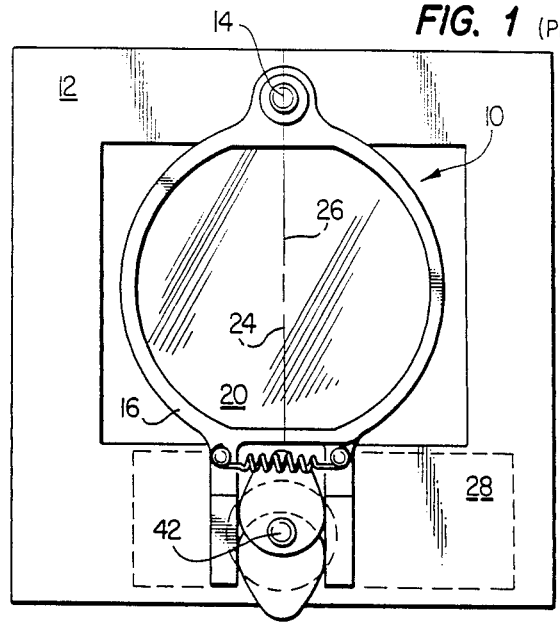
FIG. 1 is a front elevation view of a prior art linear optical scanner with the two wedge prisms coaxially aligned.
Figure 2:
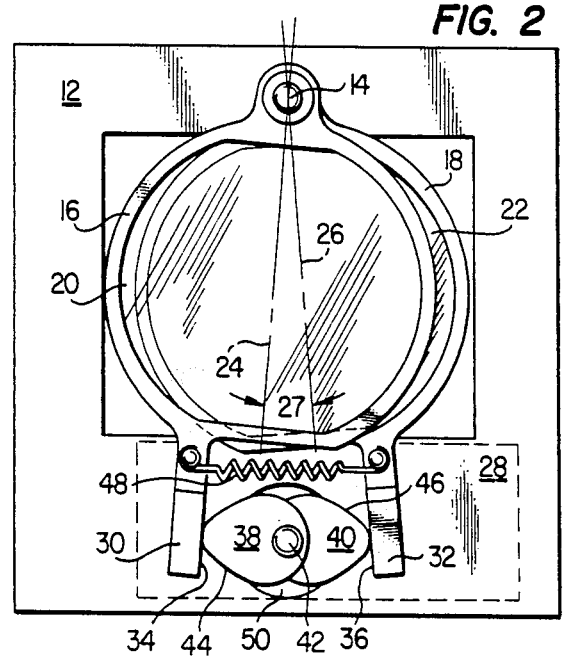
FIG. 2 is a front elevation of the linear optical scanner of FIG. 1 with the wedge prism pivoted through a predetermined pivot angle.

FIGS. 1 and 2 show front elevation views of a prior art linear optical scanner as described in the Fjeldsted patent. In FIG. 1 the wedge prisms of the scanner are coaxially aligned. FIG. 2 shows the wedge prisms in a counter-rotated position.

Referring to FIG. 2, the linear optical scanner 10 comprises a mounting plate 12 and a pivot axis 14. Pivotably mounted on pivot axis 14 are first and second wedge prism holding frames 16 and 18, respectively. Mounted in first wedge prism holding frame 16 is a first wedge prism 20. Mounted in second wedge prism holding frame 18 is a second wedge prism 22. A first pivot reference 24 defines a line extending through the optical axis (not shown) of first wedge prism 20 and pivot axis 14. A second pivot reference describes a line extending through the optical axis of second wedge prism 22 and pivot axis 14. During operation of optical scanner 10, wedge prism holding frames 16 and 18 are periodically and reciprocally counter-rotated through a predetermined angle. Angle 27 represents the angle between pivot references 24 and 26 at the point of maximum rotation of prism holding frames 16 and 18. In the reciprocation cycle, prism holding frames 16 and 18 travel to a position shown in FIG. 1 (where pivot references 24 and 26 are aligned) to second point of maximum rotation. At the second point of maximum rotation, pivot references 24 and 26 are at an angle equal to that of angle 27 but with pivot references 24 and 26 in orientation with respect to each other reversed from that shown in FIG. 2. Structure for periodically and reciprocally counter-rotating each wedge prism frame is represented schematically by function block 28.

The structure for periodically and reciprocally counter-rotating the prism holding frames 16 and 18 comprises first and second cam followers 30 and 32, respectively. First cam follower 30 has a cam follower surface 34 which bears against cam surface 44 of a first cam 38. Second cam follower 32 has a cam follower surface 36 which bears against cam surface 46 of a second cam 40. Cams 38 and 40 are rotated around cam shaft 42 by a drive motor 50. Return spring 48 exerts a force maintaining cam followers 30 and 32 against their respective cam surfaces 44 and 46.

Return spring 48 provides at its point of minimum stretch a predetermined minimum force to hold cam followers 30 and 32 against their respective cam surfaces 44 and 46. As the wedge prism frames 16 and 18 are counter-rotated (for example, from the position in FIG. 2, past to that of FIG. 1 to a counter-rotated position and back through that of FIG. 1 to the position of FIG. 2), return spring 48 is alternately stretched and relaxed, thus producing an oscillating load on cam followers 30 and 32 against cam surfaces 44 and 46. As return spring 48 is increasingly stretched from its most relaxed state, a greater than the desired minimum load is exerted by cam followers 30 and 32 against cam surfaces 44 and 46. This increased loading puts an undesired excess radial force on cam shaft 42, and requires a higher power consumption by motor means 50 than would be required if only the minimum desired force were exerted against cam surfaces 44 and 46. It also results in increased audio noise generated at the interface between the cam followers 30 and 32 and the cam surfaces 44 and 46. The structure also increases wear on the cams 38 and 40 and cam followers 30 and 32, and increases wear on the cam bearing, cam drive gear head and outboard bearings (not shown in FIGS. 1 and 2). Further, the oscillating load on cams 38 and 40 adversely affects motor speed control leading to undesired speed variations in the counter-rotation function of the optical scanner, particularly where a low-torque motor is used. Another disadvantage of the return spring arrangement shown in FIGS. 1 and 2 is that it requires greater weight and space than is optimum.

Embodiments of the present invention are shown in FIGS. 3 through 8. The present invention avoids the difficulties described with regard to the prior devices and provides a means whereby a relatively equal and constant force is applied in the same direction to each of two counter-reciprocating structures. A pivoting rocker arm having a predetermined force applied at its fulcrum transmits relatively equal and constant portions of the predetermined force to each of the reciprocating structures.

Figure 4:
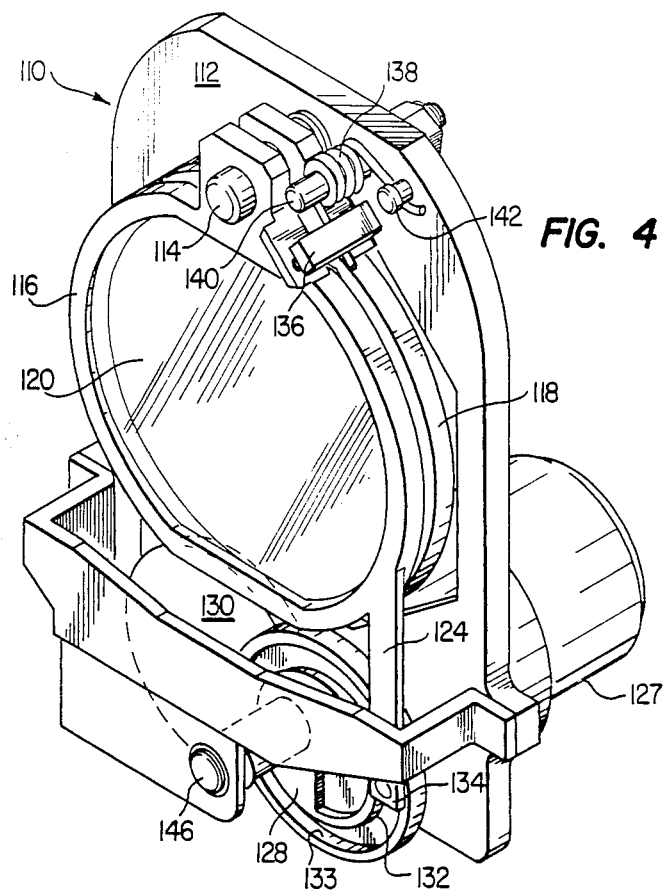
FIG. 4 is an elevated perspective view of the linear optical scanner and embodiment shown in FIG. 3.

The embodiments shown in FIGS. 3 to 8 describe the present invention applied in conjunction with a linear optical scanner such as described in the Fieldsted patent. FIGS. 3 to 6 show one embodiment of the present invention and, accordingly, use the same reference numbers to refer to like and corresponding elements of the device. FIG. 3 is a front elevation view of a linear optical scanner showing an embodiment of the present invention. FIG. 4 is an elevated perspective view of the linear optical scanner and embodiment of the present invention shown in FIG. 3. In FIGS. 3 and 4 the wedge prisms are shown coaxially aligned.

Referring to FIGS. 3 and 4, the linear optical scanner 110 includes mounting plate 112 and pivot axis 114. Pivoting from pivot axis 114 are first and second wedge prism holding frames 116 and 11B. During the operation of the scanner 110, frames 116 and 118 are counter-rotated on pivot axis 114 through a predetermined angle. Mounted on the first and second wedge prism holding frames 116 and 118 are first and second wedge prisms 120 and 122. The first wedge prism holding frame 116 includes a first cam follower 124 and first follower bearing 134 which is driven by first cam 12B. First follower bearing 134 is a miniature radial bearing. First follower bearing 134 bears against first cam internal radial surface 132 of first cam 128. First cam 128 is a positive acting cam, by which is meant first cam 128 has both internal and external radial surfaces 132 and 133, forming a groove in which the first follower bearing 134 travels. Internal radial surface 132 is the surface of the groove radially nearer cam shaft 146. External radial surface 133 is the surface of the groove radially more distant from cam shaft 146. The groove formed between cam surfaces 132 and 133 is slightly larger than the follower bearing diameter to facilitate the travel of follower bearing 134 in the groove. Use of a positive acting cam prevents large motions of the followers from occurring during external shock loads to the linear optical scanner. The cam followers, however, must still be loaded against one side of the cam groove to maintain motion precision for the first and second wedge prism holding frames. The first follower bearing 134 is preloaded by the rocker arm device of the present invention against the internal surface 132 of first cam 128. Motor 127 drives cams 128 and 130.

The second wedge prism holding frame 118, in similar manner to the first wedge prism holding frame described above, also includes a cam follower 126 and follower bearing 135 as shown in phantom lines in FIG. 3. Second follower bearing 135 is captured in a groove between the internal and external radial surfaces of second cam 130. Second follower bearing 135 is loaded against the external radial surface of second cam 130. The external radial surface of second cam 130 is that surface of the groove in cam 130 which is radially more distant from cam shaft 146 than the other surface of the groove.

It should thus be noted that both the first and second cam followers 124 and 126 are loaded in the same direction (with respect to pivot axis 114) against their respective cam surfaces, i.e. First cam follower 124 is loaded against the internal radial surface 132 of the groove in first cam 128. Second cam follower 126 is loaded against the external radial surface of the groove in second cam 130.

An important aspect of the present invention is shown in FIGS. 3 to 6 wherein a rocker arm 136, having a fulcrum 144, is preloaded by and mounted on spring 138. Spring 138 is positioned on spring mounting pin 140 and secured with spring tensioner 142. Rocker arm 136 bears against first and second contact points 148 and 150 which are on first and second contact surfaces 147 and 149 respectively. Contact points 148 and 150 are spherical pads comprising bearing balls embedded in contact surfaces 147 and 149. Spring 138 is a torsion spring and supplies a predetermined force against the fulcrum 144 of rocker arm 136 in the direction indicated by explantory arrow 152 in FIG. 3. At least a portion of this predetermined force is applied to each of contact points 148 and 150 by rocker arm 136.

Figure 5:
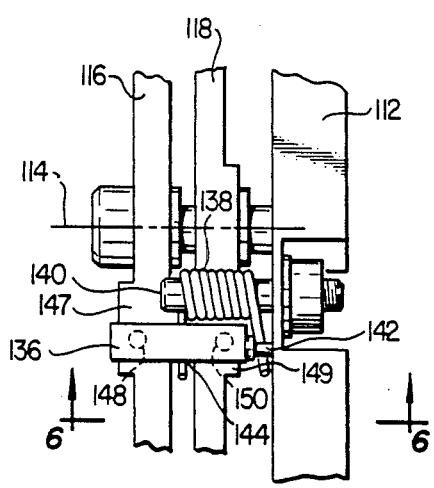
FIG. 5 is an elevated side view of the rocker arm assembly shown in FIGS. 3 and 4.

FIG. 5 is an elevated side view of the rocker arm assembly shown in FIGS. 3 and 4. As can be seen, rocker arm 136 is mounted on spring 138 and spring 138 extends through a center point or fulcrum 144 of rocker arm 136. Spring 138 is secured with tension 142. Mounting pin 140 is attached to mounting plate 112 by a conventional nut.

Figure 6A:
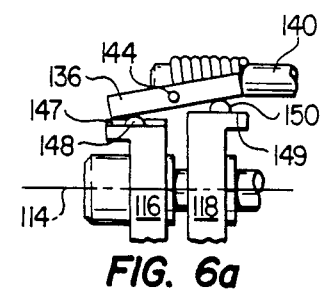
FIG. 6a is a sectional view taken substantially along line 6 of FIG. 5 with the wedge prisms in a first counter-rotated position.
Figure 6B:
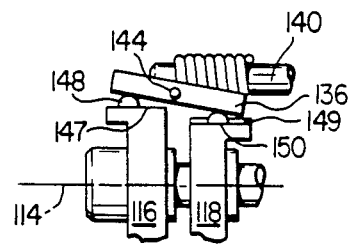
FIG. 6b is a sectional view taken substantially along line 6 of FIG. 5 with the wedge prisms in a second counter-rotated position.

The operation of the rocker arm is shown in FIGS. 6a and 6b. As the wedge prism holding frames 116 and 118 are counter-oscillated, the rocker arm 136 tilts on its fulcrum 144, applying the same balanced load to each of contact points 148 and 150, and, accordingly, applying the same balanced load to the first and second cam followers 124 and 126 and cam follower bearings 134 and 135 at any position in their respective travel. Spring 138 is designed to apply only that loading required, and since spring 138 is attached at the fulcrum 144 of rocker arm 136, the deflection of the spring 138 remains constant, i.e. the spring does not stretch and relax with the wedge prism motion, during the counter-oscillating operation of the linear optical scanner. Accordingly, an essentially constant and non-varying force is applied to contact points 148 and 150, through the counter-oscillating motion of the wedge prisms, serving to maintain the cam follower bearings 134 and 135 against their respective cam surfaces.

The non-oscillating nature of the load applied by rocker arm 136 to contact points 148 and 150, and, accordingly, the non-oscillating cam loading of cam followers 124 and 126, results in significant advantages. Among these are reduced electrical power to drive motor 127, reduced wear on each cam and cam follower bearing, a reduction in audible noise generated at the interface of the follower bearings and cam surfaces, and a reduction in the side load exerted on the cam and motor gear head and outboard bearings, thus increasing the life of these parts. Significantly, another advantage is improved motor speed control. In addition, with the present invention, the overall size and weight of the scanner is reduced, as compared with the configurations of the prior devices.

The present invention takes advantage of an arrangement in which each of the wedge prism holding frames 116 and 118 move simultaneously in opposite directions, but require a load applied to each in the same direction.

Various permutations of cam/cam follower configurations are possible while still having the cam followers loaded in the same direction. In the embodiment described in FIGS. 3 through 6, the first cam follower 134 is loaded against the inside surface of its cam groove while the second cam follower 135 is loaded against the outside surface of its cam groove. An alternative configuration is one in which both followers are located on the same side of the cam shaft or axis 146 and each is loaded against the inside surface of its respective cam groove. In either configuration, the rocker arm loader acts in such a way as to provide a constant net radial load on the cam shaft and a relatively non-oscillating load on the contact points of each wedge prism frame.

In the embodiment described in FIGS. 3 through 6, the preload force has been applied to the rocker arm by a helical torsion spring 138 which extends through the fulcrum or center of the rocker arm. It is not necessary that the helical spring pass through the center of the rocker arm, but only that the spring be attached to the rocker arm at or near its fulcrum in such a manner as to allow the rocker arm to rock during the oscillation of the wedge prism frames. Moreover, it is not necessary that the spring comprise a helical torsion spring. Any other type of spring or other means could be used so long as it provides the desired force at or near the fulcrum of the rocker arm in such a manner that the rocker arm can rock on its fulcrum during the counter-oscillation of each prism holding frame while exerting the desired force against the contact points.

As an example, an alternate embodiment is shown in FIG. 7, which shows a plunger 170 disposed in mount 174 with a compression spring 172 which exerts the desired preload force against the rocker arm 176. The rocker arm 176 in the embodiment of FIG. 7 can pivot and twist on a spherical pivot point which also serves as the fulcrum for the rocker arm.

In the embodiment shown in FIGS. 3 to 6, it can be seen that contact surfaces 147 and 149 are wider than the other width dimensions of the wedge prism holding frames 116 and 118 so as to allow a greater distance in separation between contact points 148 and 150. For a given range of movement by the wedge prism holding frames, a greater distance separating contact points 148 and 150 results in a decrease in the angle at which the rocker arm 136 must rock on its fulcrum 144. Moreover, in the same embodiment, the rocker arm 136 is positioned relatively close to pivot axis 114, so as to reduce the range of movement in the wedge prism frames with respect to the rocker arm fulcrum 144, thus again reducing the angle at which rocker arm 136 must rock on its fulcrum 144.

In the embodiment of FIGS. 3–6 it is desired to load the cam followers against their respective cams with sufficient force to overcome cam accelerations and some handling forces as a minimum. The force of the spring and the positioning of the rocker arm from the pivot point 114 as well as the distance separating contact points 148 and 150 as well as other considerations are design choices, within the ability to the skilled in the art, made to meet the requirements of the particular application desired.

Various devices can be used to assist in maintaining the rocker arm in its desired position with regard to the contact points on the wedge prism holding frames. An example of one such embodiment is shown in FIG. 8 which shows the surface of a rocker arm 180 which faces the contact points of the wedge prism holding frames. Shown on one side of fulcrum 182 of the rocker arm is a dimple 184 into which fits one of the contact points, and a groove 186 into which fits the other contact point. As the wedge prism holding frames counter-oscillate, the distance between the contact points cyclicly varies to a small degree. The groove 186 allows the contact points to be maintained in their proper relation to the rocker arm 180 during the cyclic variations in the distance between the contact points.

In the embodiment of FIG. 8, since the distance between fulcrum 182 and dimple 184 is fixed, the rocker arm sustained on this fulcrum point from the torsional spring will actually waggle slightly from side to side during the oscillations of the wedge prism holding frames as dimple 184 remains fixed in its relationship to its respective contact point and the other contact point slides along the length of groove 186. It will be understood, of course, that other means may be used to position the rocker arm against the contact points. For example, a combination of two grooves rather than a groove and a dimple could be used on the rocker arm. Moreover, the contact points could be mounted on the rocker arm and bear against the contact surfaces of the wedge prism holding frames which, additionally, could comprise dimples or grooves.

Shown in phantom lines are contact points 148 and 150 on contact surfaces 147 and 149. Rocker arm 136 is forced against contact points 148 and 150 by spring 138.

It should be noted also that, due to the design of cam chosen in certain embodiments, the fulcrum of the rocker arm may not remain in one position with regard to the pivot axis during the counter-oscillation of the cam driven members. Accordingly, the spring supplying the preload to the rocker arm would flex slightly as the fulcrum changed position. However, these slight flexes of the spring would result in minimal variations in the force applied to the cam drive members and the advantages of the invention would still be realized.

The present invention is not limited to applications only with linear optical scanners, but can be applied in any situation where it is desired to apply an approximately continuous and constant force in the same direction against two counter-oscillating members. The present invention has particular application where the two counter-oscillating members are driven by a cam means and the force provided by a rocker arm assembly of the present invention serves to maintain the cam followers of the members against their respective cam surfaces.

While the present invention has been described with respect to preferred embodiments, it is to be understood that the invention is capable of numerous modifications by arrangements and changes that are within the scope of the invention as defined by the amended claims.

What is claimed is:

1. A loading device for providing a force against each of two cyclically reciprocating structures comprising:
   a rocker arm having a fulcrum with a predetermined force applied to said rocker arm at said fulcrum;
   a contact surface on each of the reciprocating structures for contacting said rocker arm;
   said rocker arm positioned so that at least a portion of said predetermined force is applied through said rocker arm to each of said contact points; and
   said rocker arm also positioned so that as said structures reciprocate said rocker arm rocks on said fulcrum, maintaining contact with said contact surfaces and transmitting at least a portion of said predetermined force to said contact points continuously throughout the reciprocation cycle of each of said structures.

2. The device of claim 1, wherein:
   each of the reciprocating structures comprises a wedge prism of a linear optical scanner; and
   said rocker arm is positioned with said fulcrum parallel to a defined point between said contact surfaces so that as said structures reciprocate, said rocker arm rocks on said fulcrum and maintains contact with said contact surfaces.

3. The device of claim 1, wherein each of said structures counter-reciprocate at approximately 180° out of cycle with the other.

4. The device of claim 3, wherein each of said structures comprises a pivoting member which pivots through a predetermined angle from a common pivoting axis.

5. The device of claim 4, wherein said pivoting members are driven by a common driving means.

6. The device of claim 4, wherein each pivoting member is driven by a cam and cam follower with said loading device serving to maintain each said cam follower against said cam with a desired force.

7. The device of claim 6, wherein said predetermined force is applied to said rocker arm by a spring.

8. The device of claim 7, wherein said sprng comprises a torsion spring.

9. The device of claim 7, wherein said spring comprises a compression spring.

10. A cam follower preload device comprising:
    a pair of cyclically reciprocating cam driven structures;
    each said structures having a cam follower which bears against the surface of a cam which drives said cam follower;
    a rocker arm having a fulcrum with a predetermined preload force applied against said rocker arm at approximately said fulcrum;
    contact surfaces on each said cam driven structure for contacting said rocker arm;
    said rocker amm supported in relation to said cam driven structures so that as said structures reciprocate said rocker arm rocks on said fulcrum, maintaining contact with each said contact surface and transmitting at least a portion of said preload force to each said contact surface, at least a portion of said transmitted force serving to force each said cam follower against the surface of the cam driving said cam follower.

11. The preload device of claim 10, wherein said cam driven structures comprise prisms which reciprocate at approximately 180 degrees out of cycle with each other.

12. The preload device of claim 10, wherein said predetermined preload force is applied to said rocker arm by a spring mechanism.

13. The preload device of claim 12, wherein said spring mechanism comprises a torsion spring.

14. The preload device of claim 12, wherein said spring mechanism comprises a compression spring.

15. The preload device of claim 12, wherein said cam driven structures comprise wedge prism frames which counter-reciprocate through a predetermined angle about a common pivot axis.

16. The preload device of claim 13, wherein said rocker arm is supported in relation to said cam driven structures by a portion of said torsion spring which contacts said rocker arm at its fulcrum.

17. The preload device of claim 16, wherein said cam driven structures comprise wedge prism frames which counter-reciprocate through a predetermined angle about a common pivot axis.

18. A cam follower preload device for use in a linear optical scanner, comprising:
a first wedge prism frame having a first cam follower and having a wedge prism fixed to said wedge prism frame;
a second wedge prism frame having a second cam follower and having a wedge prism fixed to said wedge prism frame;
said first and second wedge prism frames pivotably attached at a common pivot axis;
each of said first and second cam follower bearing against the surface of at least one cam, said at least one cam serving with said cam followers to periodically and reciprocally counter-rotate said wedge prism frames through a predetermined angle about said common pivot axis;
a rocker arm having a fulcrum, said rocker arm movably mounted at approximately said fulcrum with respect to said pivot axis so that said fulcrum can travel approximately tangentially with respect to said pivot axis, said rocker arm also mounted so that it can rock in relation to said fulcrum;
a predetermined preload force applied to said rocker arm at approximately said fulcrum;
a first contact surface on said first wedge prism frame for contacting said rocker arm;
a second contact surface, said second contact surface on said second wedge prism frame for contacting said rocker arm;
said rocker arm positioned with respect to said contact surfaces so that, as said first and second wedge prism frames periodically and reciprocally counter-rotate, said rocker arm rocks in relation to said fulcrum, maintaining continuous contact between said rocker arm and said contact surfaces;
said rocker arm continuously transmitting at least a portion of said preload force to each of said contact surfaces throughut said periodic and reciprocal counter-rotation of said first and second wedge prism frames;
at least a portion of said force transmitted to said first contact surface from said rocker arm serving to force said first cam follower toward said surface of said at least one cam against which said first cam follower bears;
at least a portion of said force transmitted to said second contact surface from said rocker arm serving to force said second cam follower toward said surface of said at least one cam against which said second cam follower bears.

19. The preload device of claim 18, wherein said first and second wedge prism frames counter-rotate at approximately 180 degrss out of cycle with each other.

20. The preload device of claim 18, wherein said predetermined preload force is supplied to said rocker arm by a spring.

21. The preload device of claim 20, wherein said spring comprises a torsion spring passing through an aperture adjacent said fulcrum of said rocker arm.

22. The preload device of claim 21, wherein said preload device provides an essentially constant non-oscillating force to each of said wedge prism frames in a direction to force each said cam follower toward its respective cam surface.

23. The preload device of claim 19, wherein said preload device provides an essentially constant non-oscillating force to each of said wedge prism frames in a direction to force each said cam follower toward its respective cam surface.

24. A method for loading a force against each of two cyclically reciprocating structures, said method comprising:
applying a preload force against a fulcrum of a rocker arm;
transmitting at least a portion of said applied force to contact surfaces on each of said cyclically reciprocating structures by way of said rocker arm;
counter-reciprocating said structures through cycles of counter-reciprocation;
rocking said rocker arm on said fulcrum during said counter-reciprocation cycles of said structures to maintain contact with said contact surfaces of each of said structures through its respective reciprocation cycle; and
transmitting at least a portion of said applied force through said rocker arm to each of said contact surfaces through the counter-reciprocation cycle of said reciprocating structures.

25. The method of claim 24, further comprising:
applying said predetermined force to said fulcrum of said rocker arm by means of a torsion spring passing through an aperture of said rocker arm at said fulcrum.

26. The method of claim 25, further comprising: cyclically counter-reciprocating said structures at approximately 180 degrees out of cycle with the each other.

* * * * *